United States Patent [19]
Schroeder

[11] Patent Number: 6,146,068
[45] Date of Patent: Nov. 14, 2000

[54] DUNNAGE FRAME AND LATCH ASSEMBLY

[76] Inventor: Robert C. Schroeder, 7435 Gills Pier Rd., Northport, Mich. 49670

[21] Appl. No.: 09/225,882

[22] Filed: Jan. 5, 1999

[51] Int. Cl.⁷ .................................. B60P 7/12; B61D 3/16
[52] U.S. Cl. ................................. 410/35; 410/32; 410/43; 410/143
[58] Field of Search ................. 410/32, 43, 34, 410/35, 143, 150, 152; 211/41.1, 175, 189

[56] References Cited

U.S. PATENT DOCUMENTS

| | | |
|---|---|---|
| 4,702,653 | 10/1987 | Gaulding et al. .................... 410/152 X |
| 4,771,975 | 9/1988 | Johnson et al. .......................... 248/393 |
| 5,037,256 | 8/1991 | Schroeder . |
| 5,378,093 | 1/1995 | Schroeder . |
| 5,582,495 | 12/1996 | Schroeder . |
| 5,605,239 | 2/1997 | De Voursney et al. ............. 410/143 X |
| 5,876,165 | 3/1999 | Campbell ............................ 410/143 X |
| 5,890,856 | 4/1999 | Huang ................................. 410/143 X |

*Primary Examiner*—D. Glenn Dayoan
*Assistant Examiner*—Scott A. Carpenter
*Attorney, Agent, or Firm*—Reising, Ethington, Barnes, Kisselle, Learman & McCulloch, PC

[57] ABSTRACT

A frame assembly for shipment of dunnage includes a frame for supporting the dunnage. A bar and latch arrangement releasably secures the dunnage in the frame. The bar and latch arrangement includes a bar mounted on the frame for swinging movement in a direction toward the dunnage. A latch has a latch bolt mounted on the bar for movement from a retracted to an extended position. A rack is mounted on the frame in a position adjacent to the latch bolt when the bar is in the dunnage retaining position. The rack has a plurality of teeth aligned in the direction of bar movement. The latch bolt is engageable in any of the spaces between the teeth when the latch bolt is in its extended position to hold the bar in the dunnage retaining position.

6 Claims, 3 Drawing Sheets

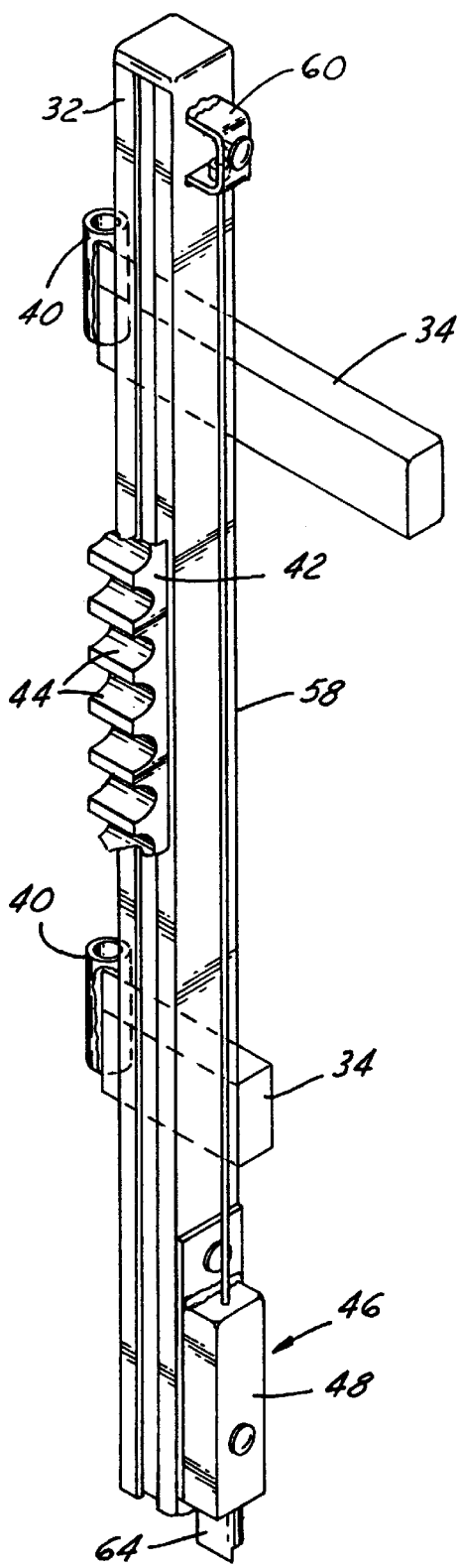
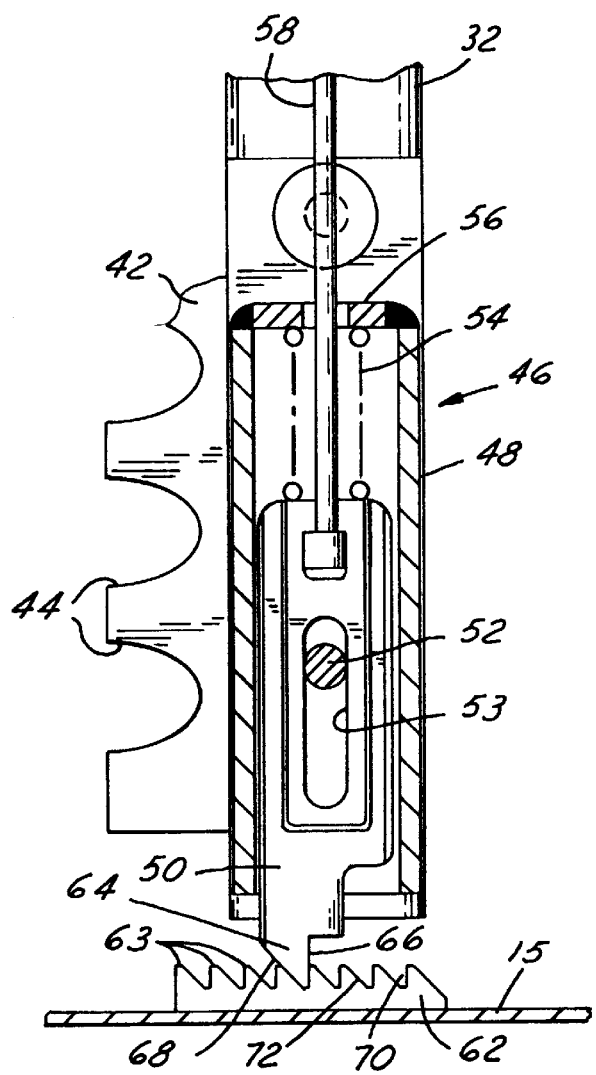

DUNNAGE FRAME AND LATCH ASSEMBLY

This invention relates generally to frame assemblies for shipment and storage of dunnage, and more particularly to a dunnage bar positioning and latching arrangement for use in such frame assemblies.

BACKGROUND AND SUMMARY OF THE INVENTION

A wide variety of latching arrangements have been used for securing a dunnage bar to a frame in a fixed position to support and retain lading carried by the frame during shipment. These bars, commonly known as dunnage bars, are releasably secured in a fixed position by latching devices that either permit the bar to be disengaged from the frame or retracted so that the cargo may be unloaded.

In one such arrangement described in applicant's U.S. Pat. No. 5,582,495, a frame assembly for shipment of dunnage includes a frame having support rails for the dunnage, and a bar and latching arrangement for locking the dunnage against the support rails. The bar and latching arrangement includes a bar which in its advanced position engages the dunnage to lock the dunnage in the frame. A latch bolt on the bar engages a hole in a striker to lock the dunnage bar in position.

In accordance with the present invention, a latch bolt on the dunnage bar is movable from a retracted to an extended position, and in the extended position is adapted to engage a rack mounted on the frame. The rack has a plurality of aligned teeth. The latch bolt when extended is engageable in any one of the spaces between the teeth to hold the bar in the dunnage retaining position.

The dunnage may vary dimensionally from load to load and also its position in the frame assembly may vary. For that reason, it may be desirable to latch the dunnage bar in an adjusted position depending upon the dimensions or position of the dunnage. The latch bolt and rack arrangement of this invention enables latching the dunnage bar in different adjusted positions because the latch bolt will engage in any one of the spaces between adjacent teeth, thereby accommodating loads in which the dunnage is positioned differently in the frame or differs dimensionally.

Preferably, the teeth of the rack have camming surfaces to enable the latch bolt to cam over the teeth during movement of the dunnage bar toward the dunnage. This enables the bar to be latched in an optimum position.

The dunnage may be either in the form of flat panels supported horizontally, in which case the dunnage bar will extend vertically, or they may be arranged vertically, in which case the dunnage bar will extend horizontally.

One object of this invention is to provide a frame and latching assembly having the foregoing features and capabilities.

Another object is to provide a frame and latching assembly which is composed of a relatively few simple parts, is rugged and durable in use, and is capable of being inexpensively manufactured and quickly and easily operated.

These and other objects, features and advantages of the invention will become apparent as the following description proceeds, especially when considered with the accompanying drawings.

BRIEF DESCRIPTION OF THE DRAWINGS

FIG. 3 is a detail view in elevation of the dunnage bar and latch structure at the lower end of the dunnage bar.

FIG. 4 is an enlarged, fragmentary, sectional view taken on the line 4—4 in FIG. 1, showing the latch on the lower end of the dunnage bar engaging a rack attached to the frame.

DETAILED DESCRIPTION OF THE PREFERRED EMBODIMENTS

Figure 1:
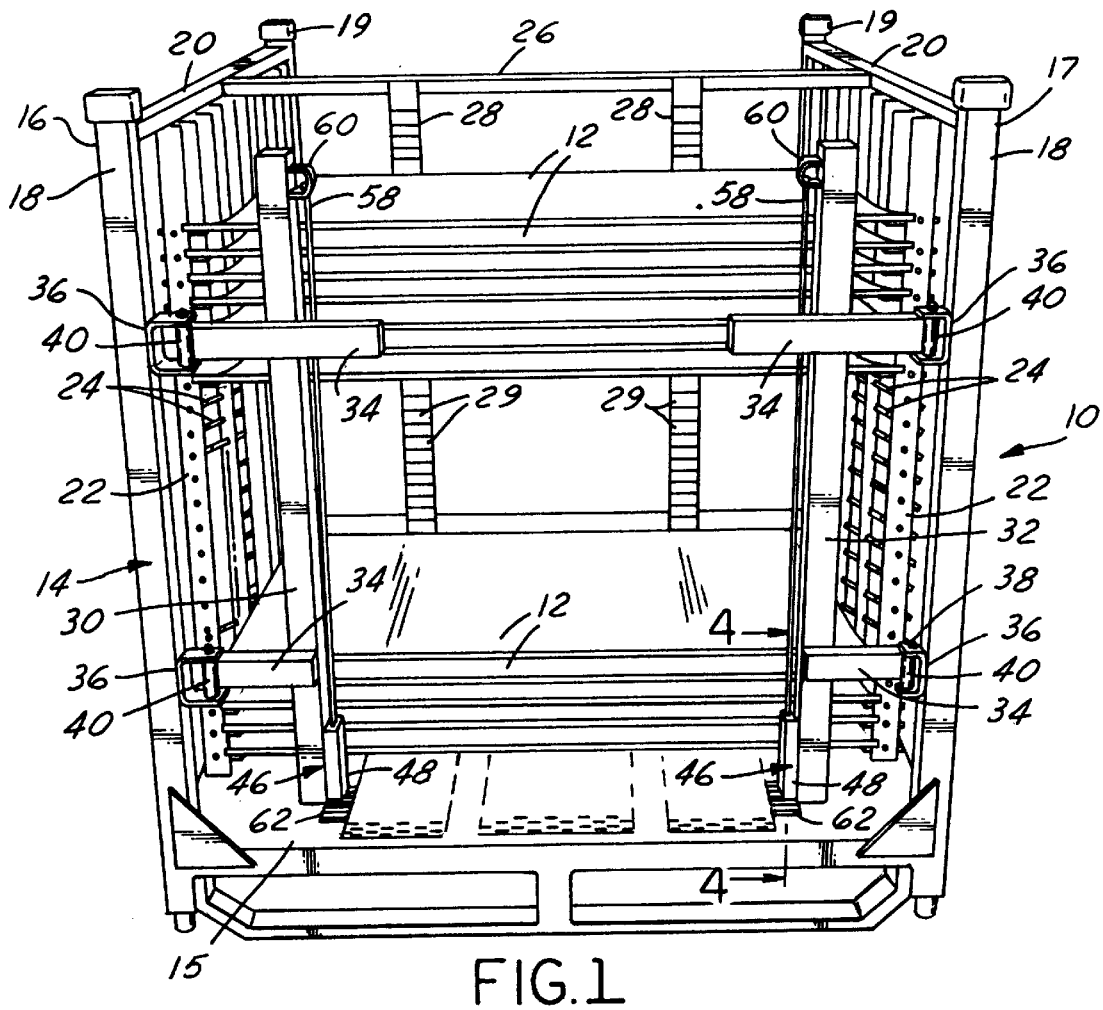
FIG. 1 is a front elevational view of a shipping frame for panels, having dunnage bars and latch arrangements for the bars, constructed in accordance with the invention.

Referring now more particularly to the drawings, and especially FIGS. 1–4, there is shown a frame assembly 10 constructed in accordance with a preferred embodiment of the invention, for storage and shipment of dunnage, in this instance panels 12, such as automotive door panels. A generally rectangular frame 14 has a horizontal bed or floor 15. Side walls 16 and 17 extend upwardly from opposite sides of the floor. The side walls each have front and rear vertical posts 18 and 19 connected at the tops by horizontal frame members 20. Extending between the front and rear posts of each side wall are spaced upright channels 22 which extend from the floor 15 to the frame member 20. These channels carry vertically spaced support tabs 24 which project laterally inwardly to support the opposite side edges of each of the panels. A horizontal cross member 26 extends between the frame members 20 near the rear of the frame. Vertical, laterally spaced panel supports 28 extend between the cross member 26 and the floor 15 and are notched to provide vertically spaced recesses 29 to support the rear edges of the panels. Thus each panel 12 is supported along the rear edge in recesses 29 of the rear panel supports 28 and along the side edges by tabs 24 carried by the upright channels 22. When supported in this manner, the panels 12 are horizontal and spaced apart vertically.

The front of the frame 14 is open, but the panels 12 are adapted to be retained in the frame by elongated upright dunnage bars 30 and 32. The dunnage bars are laterally spaced apart and mounted on vertically spaced, horizontal support arms 34. The laterally outer end of each support arm extends into a channel clip 36 mounted on one of the front upright posts 18, being pivoted thereto by a vertical pivot pin 38 extending through a hinge knuckle 40 on the arm and through the two legs of each channel clip. The dunnage bars are thus capable of horizontal swinging on a vertical axis from an advanced position (FIG. 1) in which they engage the forward edges of the panels and retain them in the dunnage frame, to a retracted position shown in FIG. 2 in which they are swung forwardly and laterally outwardly through an angle of more than 90° to clear the front of the frame and allow the panels to be slid forwardly and removed from the frame. Secured to the dunnage bars 30, 32 are elongated panel supports 42 which are notched to provide vertically spaced recesses 44 to support the front edges of the panels when the bars are in the FIG. 1 position. In the FIG. 1 position of the bars 30, 32, the panel supports 42 face rearwardly. Panel supports 42 may be similar in construction to the rear panel supports 28.

Each dunnage bar has a latch arrangement 46. Each latching arrangement comprises a vertically extending housing 48 secured to the laterally inner surface of the dunnage bar at the lower end thereof. Axially slidably mounted within each housing is a latch bolt 50 which is guided in its vertical movement by the walls of the housing. A cross pin 52 secured to the housing extends through a vertically elongated slot 53 in the latch bolt to limit latch bolt travel. A coil spring 54 is compressed between the latch bolt and the upper wall 56 of the housing, urging the latch bolt downwardly to its extended position. A cable or like flexible linear member 58 extends through the upper wall 56 of the housing and has its lower end secured to the latch bolt. Its upper end is secured to a clip 60 mounted on the upper end of the dunnage bar. This cable is employed to manually withdraw the latch bolt upwardly to a retracted position against the force of the coil spring 54.

Figure 2:
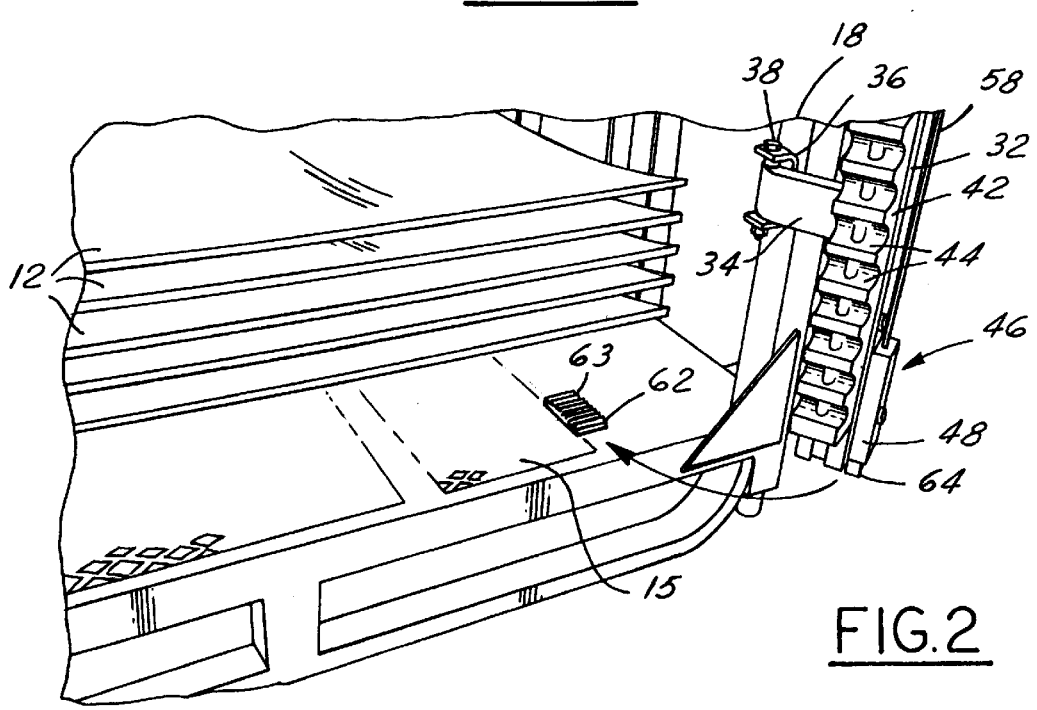
FIG. 2 is an enlarged, fragmentary, perspective view of a portion of the structure in FIG. 1, showing one of the dunnage bars in its retracted position.

Associated with each latch bolt is a rack 62 mounted on the floor 15 of the frame in a position directly beneath the latch bolt when the dunnage bar is in the panel retaining position shown in FIG. 1. The rack as seen in FIGS. 1, 2 and 4 is an elongated member having a plurality of spaced apart teeth 63 which are aligned with the direction of swinging movement of the dunnage bar. Each rack is a straight elongated member extending in a front to rear direction so that it is directly beneath the latch bolt in the final stages of the swinging movement of the dunnage bar to its panel retaining position.

The lower end of the latch bolt 50 has a head 64 which is adapted to extend into any one of the spaces between the teeth of the rack. The front surface 66 of the latch bolt is vertical and the rear surface 68 is inclined upwardly and rearwardly at an acute angle as shown in FIG. 4. The rack teeth are likewise cut at the same angle as the head of the latch bolt, with the rear face 70 of each tooth extending vertically and the front face 72 extending upwardly and rearwardly at the same angle as the rear surface 68 of the bolt head. The bolt head is thus capable of camming over the teeth of the rack when the dunnage bar is swung rearwardly to the panel retaining position of FIG. 1. However, the vertical rear face 70 of a tooth will engage the vertical front surface 66 of the head 64 of the latch bolt to prevent the bolt from camming out of a tooth space, thereby preventing the dunnage bar from swinging forwardly to a retracted position. It is necessary to manually withdraw the latch 50 bolt by operation of the cable 58 in order to disengage the head of the latch bolt from the teeth of the rack to retract the dunnage bar.

In use, with panels 12 in position as in FIG. 1, the dunnage bars 30 and 32 are pivoted inwardly and rearwardly to the FIG. 1 position in which the panel supports 42 on the dunnage bars engage the front edges of the panels and press them rearwardly and firmly against the rear panel supports 28 so that the panels are firmly held in the frame 14. As the dunnage bars are swung into position, the heads 64 of the latch bolts 50 cam over the teeth of the racks 62 and in their final positions become engaged in a space between two adjacent teeth. The surface 66 of each latch bolt head engages a surface 70 in the space between rack teeth to prevent the dunnage bars from inadvertently swinging forwardly to open position.

When it is desired to unload the panels, the latch bolts 50 are withdrawn by manual use of the cables 58, disengaging the bolt heads 64 from the racks 62 and permitting the dunnage bars to be swung forwardly and laterally outwardly to the position shown in FIG. 2.

Figure 5:
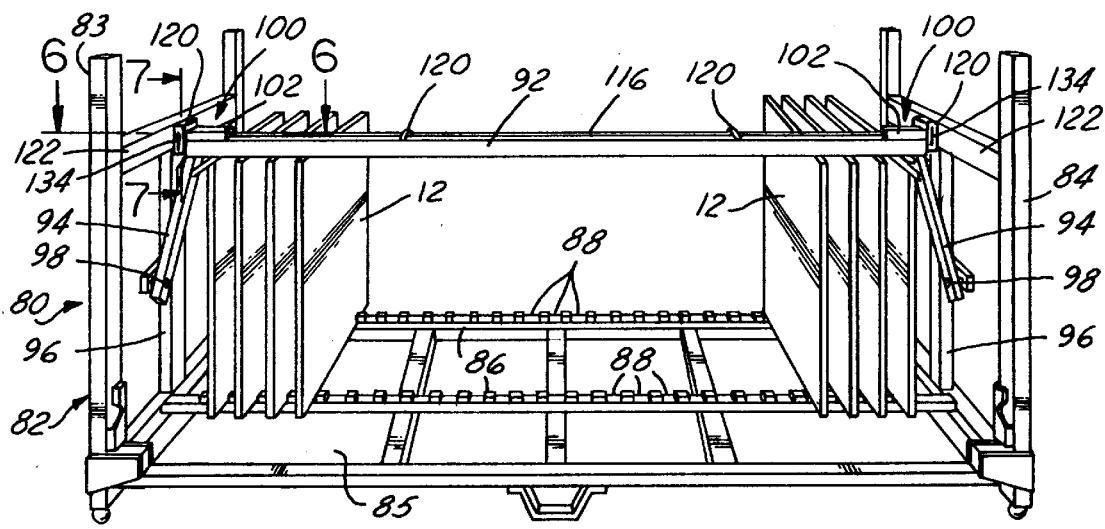
FIG. 5 is a front elevational view of a shipping frame with a dunnage bar and latch arrangement, according to a modification of the invention.
Figure 6:
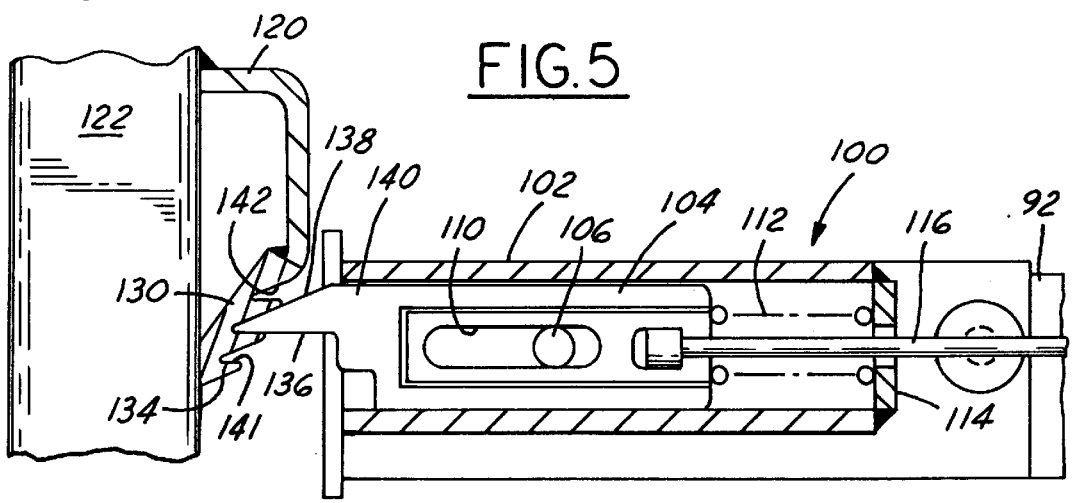
FIG. 6 is a fragmentary sectional view taken on the line 6—6 in FIG. 5.
Figure 7:
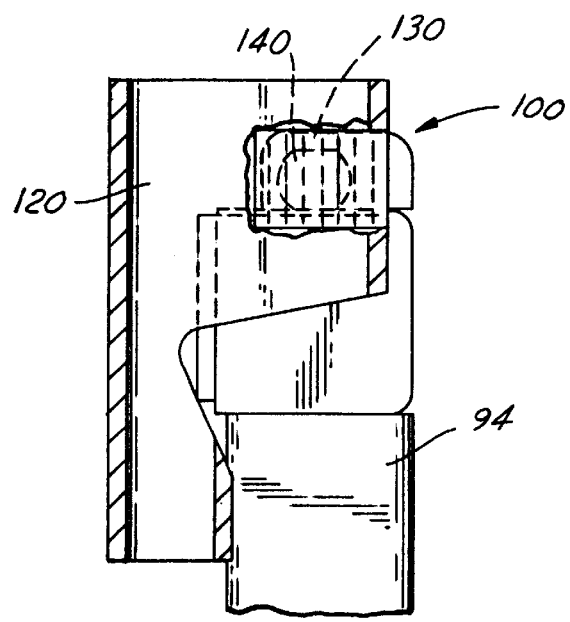
FIG. 7 is a fragmentary sectional view taken on the line 7—7 in FIG. 5.

A modification of the invention is shown in FIGS. 5–7. The frame assembly 80 comprises a generally rectangular frame 82 having laterally spaced side walls 83 and 84 and a bed 85 defined in part by a pair of laterally extending horizontal support rails 86 with individual upwardly opening recesses 88 for receiving and vertically supporting the bottom edges of the panels 12. The panels 12 in this embodiment are supported in laterally spaced, parallel vertical planes.

An elongated horizontal dunnage bar 92 is provided to retain the panels in the frame 82. A swing arm 94 is affixed to and extends from each end of the dunnage bar 92. Each swing arm 94 has one end secured to an end of the dunnage bar and extends perpendicular to the dunnage bar. The opposite end of each swing arm is pivoted to a vertical side bar 96 of a side wall 83 or 84 by a pivot 98. The swing arms 94 support the dunnage bar 92 for rearward swinging movement to the position shown in FIGS. 5 and 6 in which the dunnage bar engages and bears down upon the upper edges of the panels 12 to retain them in position for shipment. The dunnage bar may be swung forwardly and downwardly to a retracted position permitting the panels to be removed from the frame.

The dunnage bar 92 has a latch arrangement 100 at each end. The latch arrangements 100 are like the latch arrangements 46. They comprise elongated housings 102 which are secured to the ends of the dunnage bar and extend parallel to the lengthwise dimension thereof. Axially slidable within each housing is a latch bolt 104 which is guided in its horizontal movement by the walls of the housing. A cross pin 106 secured to the housing extends through a horizontally elongated slot 110 in the latch bolt to limit latch bolt travel. A coil spring 112 is compressed between the latch bolt and the inner wall 114 of the housing urging the latch bolt laterally outwardly to its extended position. A cable or like flexible linear member 116 extends through the inner walls 114 of the housings and has its ends secured to the two latch bolts. The cable passes through and is guided by clips 120 mounted on the dunnage bar. The cable is employed to enable the manual withdrawal of the latch bolts 104 laterally inwardly to a retracted position against the force of the coil springs 112.

Associated with each latch bolt 104 is a striker plate 120 mounted on a horizontal upper frame member 122 of the adjacent one of the side walls 83,84 of the frame. This striker is best shown in FIG. 6 and will be seen to have a rack 130 rigidly secured thereto. The rack has a plurality of teeth 134 which are spaced apart horizontally and are aligned with the latch bolt 104 of the associated latching arrangement in the final stages of the swinging movement of the dunnage bar to its panel retaining position shown in FIG. 5.

The outer end of each latch bolt 104 has a head 140 which is like the head of the latch bolt 50 in the embodiment previously described, and is adapted to extend into any one of the spaces between the teeth 134 of the rack 130. The front surface 136 of the head 140 is parallel to the lengthwise dimension of the latch bolt and the rear surface 138 is inclined at an acute angle as shown in FIG. 6. The rack teeth 134 are cut at the same angle as the head 140 of the latch bolt, with the rearwardly directed face 141 of each tooth extending parallel to the front surface 136 of the head when the dunnage bar is at or near its dunnage retaining position of FIG. 5, and the forwardly directed face 142 inclined at the same angle as the rear surface 138 of the bolt head 140. The bolt head is thus capable of camming over the teeth 134 of the rack 130 when the dunnage bar is swung rearwardly and downwardly to the panel retaining position of FIG. 5. However, the face 141 of a tooth will engage the surface 136 of the head 140 of the latch bolt to prevent the bolt from camming over a tooth, thereby preventing the dunnage bar from being swung upwardly and forwardly to a retracted position for removal of the panels. It is necessary to manually withdraw the latch bolt by manual operation of the cable 116 in order to disengage the head of the latch bolt from the teeth of the rack to retract the dunnage bar.

In use, and with the panels 12 in the positions illustrated in FIG. 5, the dunnage bar 92 is swung to the FIG. 5 position in which the bar engages and presses down on the upper edges of the panels, thereby holding them securely in position on the support rails 86. During this movement of the dunnage bar to the panel engaging position, the bolt heads 140 of the latch bolts 104 cam over the teeth 134 of the racks 130 and eventually lodge in a space between adjacent teeth as shown in FIG. 6. The surface 136 of each bolt head engaging a surface 141 between the rack teeth prevents the dunnage bar from being retracted in a forward direction. In order to retract the dunnage bar, it is necessary to withdraw the latch bolts and thereby disengage the rack teeth, by operation of the cable 116. When the latch bolts are thus disengaged from the rack, the dunnage bar may be swung forwardly and downwardly to a position in which the panels may be removed from the frame.

What is claimed is:

1. A frame assembly for shipment of dunnage comprising:

a frame having means for supporting dunnage, a bar and latch arrangement for releasably securing the dunnage in said supporting means, said bar and latch arrangement comprising a bar, bar mounting means mounting said bar on said frame for movement in a direction toward the dunnage in said frame to a position retaining the dunnage in said frame, a latch comprising a latch bolt, latch bolt mounting means mounting said latch bolt on said bar for movement from a retracted to an extended position, and a rack mounted on said frame adjacent to said latch bolt when said bar is in the dunnage retaining position, said rack having a plurality of teeth aligned in the direction of bar movement with spaces between said teeth, said latch bolt being engageable in any of the spaces between said teeth when said latch bolt is in its extended position to hold said bar in the dunnage retaining position, wherein said supporting means is adapted to support dunnage in the form of flat panels in laterally spaced generally vertical positions, and said bar extends horizontally and is mounted on said frame by said bar mounting means for swinging movement about a horizontal axis in the direction toward the panels.

2. A frame assembly according to claim 1, wherein the latch bolt mounting means includes a housing in which said latch bolt is mounted for sliding movement, spring means urging said latch bolt to its extended position, and manual means for moving said latch bolt to its retracted position.

3. A frame assembly according to claim 2, wherein said teeth have camming surfaces enabling said latch bolt to cam over said teeth during movement of said bar in the direction toward the dunnage.

4. A frame assembly for shipment of dunnage comprising:

a frame having means for supporting dunnage, a bar and latch arrangement for releasably securing the dunnage in said supporting means, said bar and latch arrangement comprising a bar, bar mounting means mounting said bar on said frame for movement in a direction toward the dunnage in said frame to a position retaining the dunnage in said frame, a latch comprising a latch bolt, latch bolt mounting means mounting said latch bolt on said bar for movement from a retracted to an extended position, and a rack mounted on said frame adjacent to said latch bolt when said bar is in the dunnage retaining position, said rack having a plurality of teeth aligned in the direction of bar movement with spaces between said teeth, said latch bolt being engageable in any of the spaces between said teeth when said latch bolt is in its extended position to hold said bar in the dunnage retaining position, wherein said supporting means is adapted to support dunnage in the form of flat panels in vertically spaced generally horizontal positions, and said bar extends vertically and is mounted on said frame by said bar mounting means for swinging movement about a vertical axis in the direction toward the panels.

5. A frame assembly depending on claim 4, wherein the latch bolt mounting means includes a housing in which said latch bolt is mounted for sliding movement, spring means urging said latch bolt to its extended position, and manual means for moving said latch bolt to its retracted position.

6. A frame assembly according to claim 5, wherein said teeth have camming surfaces enabling said latch bolt to cam over said teeth during movement of said bar in the direction toward the dunnage.

* * * * *